(12) United States Patent
Glahn et al.

(10) Patent No.: US 6,532,934 B2
(45) Date of Patent: Mar. 18, 2003

(54) METHOD FOR CONTROLLING CHARGE ADJUSTMENT DEVICES

(75) Inventors: Claus Juergen Glahn, Cologne (DE); Ingo Lenz, Cologne (DE); Sigurd Limbach, Solingen (DE)

(73) Assignee: Ford Global Technologies, Inc., Dearborn, MI (US)

( * ) Notice: Subject to any disclaimer, the term of this patent is extended or adjusted under 35 U.S.C. 154(b) by 18 days.

(21) Appl. No.: 09/937,925

(22) PCT Filed: Jan. 26, 2001

(86) PCT No.: PCT/EP01/01040
§ 371 (c)(1),
(2), (4) Date: Sep. 29, 2001

(87) PCT Pub. No.: WO01/55569
PCT Pub. Date: Aug. 2, 2001

(65) Prior Publication Data
US 2002/0152986 A1 Oct. 24, 2002

(30) Foreign Application Priority Data
Jan. 28, 2000 (DE) .......................... 100 03 790

(51) Int. Cl.$^7$ ................................ F02B 31/00
(52) U.S. Cl. ...................... 123/306; 123/308
(58) Field of Search ................... 123/306, 307, 123/308

(56) References Cited

U.S. PATENT DOCUMENTS

| | | | |
|---|---|---|---|
| 4,090,417 A | * | 5/1978 | Burcz et al. ............. 477/62 |
| 5,394,848 A | * | 3/1995 | Tsutsumi et al. ......... 123/399 |
| 5,522,360 A | | 6/1996 | Suzuki et al. |
| 5,669,347 A | * | 9/1997 | Cullen et al. ........... 123/306 |
| 5,740,778 A | | 4/1998 | Corcoran et al. |
| 6,199,004 B1 | | 3/2001 | Russell et al. |
| 6,226,585 B1 | | 5/2001 | Cullen |
| 6,259,986 B1 | | 7/2001 | Kotwicki |
| 6,266,597 B1 | | 7/2001 | Russell et al. |

* cited by examiner

*Primary Examiner*—John Kwon
(74) *Attorney, Agent, or Firm*—John F. Buckert; Allan J. Lippa

(57) ABSTRACT

The invention relates to a control process for charge flow management devices as arranged in the intake area of the inlet ports of direct-injection internal combustion engines and port-injection type internal combustion engines having intake ports into which no fuel is injected. The process is characterized by the fact that the charge flow management devices are not closed when the engine operates on overrun. This reduces fouling on the intake valves produced by fuel and lubricant residue.

10 Claims, No Drawings

METHOD FOR CONTROLLING CHARGE ADJUSTMENT DEVICES

The invention relates to a control process for charge flow management devices mainly as fitted in direct-injection internal combustion engines wherein such charge flow management devices are arranged in intake ports.

In direct-injection internal combustion engines, but also in port-injection type internal combustion engines having intake ports into which no fuel is injected, undesirable fouling of the intake valves will occur due to accumulations of unburnt fuel, combustion gas constituents, and lubricating oil residue. Such fouling is at least in part attributable to the charge flow management devices which, depending on the engine's operating regime, restrict the fresh-air intake flow or, where multiple intake ports are provided per cyclinder, close off individual ports either partially or fully for the purpose of permitting or optimizing a combustion process in the combustion chamber.

As the engine's operating regime changes from power output to overrun, the charge flow management devices are placed into their idle position in which they cause the fresh-air supply to be almost fully shut off. For an intake valve arranged in an intake port equipped with a charge flow management device, this constitutes a highly unfavorable operating condition. Upon a load alteration from power output to overrunning, the hot intake valve will be suddenly cut off from its fresh air supply and will cool down but slowly as a result. With the engine on overrun, this throttling effect produces a negative pressure in intake ports equipped with charge flow management devices. This causes more lubricating oil to be drawn into the engine via the valve guides, resulting in increased fouling on the hot valves. Due to the backflow of combustion gases that takes place during the last firing cycle, unburnt fuel, combustion gas constituents and lubricating oil residue will be present in the intake ports. As the charge flow management device closes, this residue is trapped in the intake port for an extended period of time, causing additional fouling.

It is the object of the invention, therefore, to provide a control method for charge flow management devices mainly as fitted in direct-injection internal combustion engines that reduces the amount of intake valve fouling due to unburnt fuels, combustion cast constituents, and lubricating oil residue.

According to the invention this is achieved by keeping the charge flow management devices open when the internal combustion engine operates on overrun. As soon as the engine enters into overrun mode, all charge flow management devices are opened and fresh air can flow into the combustion chamber without restriction. This takes place regardless of whether the engine was previously running at full, partial or idle load.

This process can be applied to all internal combustion engines comprising intake ports with charge flow management devices and wherein all or some of the intake ports merely serve to take in air without any admixture of fuel.

This control method has the following benefits from the viewpoint of preventing intake valve fouling:

All intake valves will cool down very quickly when the engine is on overrun, and will therefore quickly reach a favorable "low-temperature range" in which the valves are cleaned by the lubricating oil passing along their surface, so that fouling will be prevented.

Since there is no flow restriction, the build-up of negative pressure in intake ports fitted with charge flow management devices is eliminated. As a result, less lubricating oil will be drawn into the cylinder via the valve guides and can contribute to additional fouling when the valves are hot than would be the case with the charge flow management device closed.

Since the charge flow management is open, the unburnt fuel, combustion gas constituents and lubricating oil residue forced back into the intake port will not remain trapped therein for an extended period of time and can therefore not cause additional fouling.

What is claimed is:

1. A method for controlling a secondary throttle valve communicating with an intake valve of an engine, said intake valve communicating with an engine cylinder, and said engine providing torque to a drivetrain of a vehicle, said method comprising:

determining a torque value within said drivetrain; and, opening said secondary throttle valve when said torque value is less than zero to allow air to cool said intake valve.

2. The method of claim 1 wherein during said opening step said secondary throttle valve is moved to a full-open position.

3. The method of claim 1 further including a step of indicating when said cylinder is de-activated.

4. The method of claim 3 wherein when said cylinder is de-activated, fuel is not delivered to said engine cylinder.

5. The method of claim 3 wherein said secondary throttle valve is opened when said torque value is less than zero and said cylinder is de-activated.

6. The method of claim 1 wherein said secondary throttle valve comprises a swirl control valve disposed within an intake manifold of said engine.

7. A method for controlling a secondary throttle valve communicating with an intake valve of an engine, said intake valve communicating with an engine cylinder, and said engine providing torque to a drivetrain of a vehicle, said method comprising:

indicating when said cylinder is de-activated;

determining when said drivetrain has an overrun operating condition; and, opening said secondary throttle valve when said drivetrain has said overrun operating condition and said cylinder is de-activated to allow additional air to cool said intake valve.

8. The method of claim 7 wherein during said opening step said secondary throttle valve is moved to a full-open position.

9. The method of claim 7 wherein when said cylinder is de-activated, fuel is not delivered to said engine cylinder.

10. The method of claim 7 wherein said secondary throttle valve comprises a swirl control valve disposed within an intake manifold of said engine.

* * * * *